United States Patent [19]

Kalinowski

[11] Patent Number: 4,970,097
[45] Date of Patent: Nov. 13, 1990

[54] METHOD FOR FORMING ABRASION RESISTANT COATING ON FIBROUS GLASS SUBSTRATE

[75] Inventor: Marie R. Kalinowski, Pataskala, Ohio

[73] Assignee: Owens-Corning Fiberglas Corporation, Toledo, Ohio

[21] Appl. No.: 324,528

[22] Filed: Mar. 16, 1989

[51] Int. Cl.$^5$ .......................... D02G 3/00; B05D 3/02
[52] U.S. Cl. ................................ 427/376.2; 427/379; 427/380; 427/397.7; 428/268; 428/375; 428/379; 428/388
[58] Field of Search .................. 427/376.2, 397.7, 379, 427/380; 428/268, 375, 379, 388

[56] References Cited

U.S. PATENT DOCUMENTS

| | | | |
|---|---|---|---|
| 3,510,343 | 5/1970 | Twells | 427/376.2 |
| 3,849,181 | 11/1974 | Green | 427/397.7 |
| 3,873,469 | 3/1975 | Foster et al. | 427/376.2 |
| 3,927,165 | 12/1975 | Grochol et al. | 427/397.7 |
| 4,271,210 | 6/1981 | Yoldas | 427/169 |
| 4,361,598 | 11/1982 | Yoldas | 427/397.7 |
| 4,397,666 | 8/1983 | Mishima et al. | 65/18.3 |
| 4,576,836 | 3/1986 | Colmet et al. | 427/376.2 |
| 4,725,501 | 2/1988 | Rukavina et al. | 427/397.7 |
| 4,732,879 | 3/1988 | Kalinowski et al. | 502/5 |
| 4,753,855 | 6/1988 | Haluska et al. | 427/376.2 |
| 4,753,856 | 6/1988 | Haluska et al. | 427/376.2 |
| 4,830,879 | 5/1989 | Debsikdar | 427/376.2 |
| 4,842,888 | 6/1989 | Haluska et al. | 427/397.7 |

OTHER PUBLICATIONS

Journal of Materials Science, 15, (1980), 1765–1771, Preparation of Glass Fibres of the $ZrO_2$ $SiO_2$ and $Na_2O$–$ZrO_2$ $SiO_2$ Systems from Metal Alkoxides and Their Resistance to Alkaline Solution–K. Kamiya, S. Sakka, Y. Tatomichi.

Novel Alumino/Organic Composites as Surface Coating Media by J. H. W. Turner.

Fatipe Congr., vol. 11, pp. 353–358 Hardmon and Halden Ltd., Manchester, England, (1972).

*Primary Examiner*—Norman Morgenstern
*Assistant Examiner*—Sadie Childs
*Attorney, Agent, or Firm*—Patrick P. Pacella; Robert F. Rywalski

[57] ABSTRACT

Fibrous glass substrates are coated with a substantially unhydrolyzed, hydrolyzable mixture of a silicon alkoxide and a titanium alkoxide and the coating is then hydrolyzed and cured. This provides the glass substrate with a long flex-life, abrasion resistant coating making the fibers of utility for use in forming filter bags.

11 Claims, No Drawings

METHOD FOR FORMING ABRASION RESISTANT COATING ON FIBROUS GLASS SUBSTRATE

CROSS REFERENCE TO RELATED PATENTS

The present invention relates to U.S. Pat. No. 4,732,879, which is hereby incorporated by reference.

TECHNICAL FIELD

The present invention relates to coatings and, more specifically, metal oxide coatings for glass substrates like nonporous glass fibers. Even yet, more particularly, the present invention relates to forming a fibrous glass substrate, such as a woven fabric, which has an abrasion resistant, long flex-life coating thereon making it ideally suited as a filter bag.

BACKGROUND ART

It is generally known, as for example indicated in U.S. Pat. No. 4,732,879, that fibrous glass substrates such as, for example, woven fabrics, can be employed as filter bags for numerous and a wide variety of applications. One of the outstanding benefits of employing a fibrous glass substrate in the filter bag fabric is that glass has a high temperature resistance. Consequently, it is possible to employ such bags in high temperature atmospheres.

One of the problems, however, in employing a fibrous glass substrate as the fabric for a filter bag is the need for such glass fibers to be abrasion resistant and also to have a long flex-life. Glass is quite susceptible to abrasion and scratching of the glass leads to inferior strength In order to prevent scratching fibers not only need to be resistant to the abrasion of particulates that are being separated by filtration, but also must possess self-abrasion resistance.

As is known in the art, filter bags need to be cleaned and this cleaning typically takes one of two forms. In one, the bags are mechanically shaken such as for example by violent vibration. In another, the bags are cleaned by periodically pulsing them with blasts of air. It will thus be seen, that the bags are consequently subjected to violent flexing. There is therefore a need for the fibers to also have a long flex-life.

TEFLON material has been used as a coating for fibers used in a filter bag. While this material does provide increased abrasion resistance, it is not generally suitable for long term, high temperature applications, e.g. operation at temperature on the order of about 350° C. Neither is such a material generally suitable as a support, or undercoat, for catalytically active materials.

In accordance with the present invention a method is provided which satisfies this need in the art and which solves the existing problem. That is, a method is provided for forming an abrasion resistant, long flex-life coating on a fibrous glass substrate. In a preferred embodiment of this invention this abrasion resistant, long flex-life coating can then be overcoated with catalytically active materials such as disclosed in incorporated U.S. Pat. No. 4,732,879 and used as a catalytically active filter bag.

SUMMARY OF THE INVENTION

The above noted need in the art is satisfied by a method for forming an abrasion resistant, long flex-life coating on a fibrous glass substrate which comprises: providing an organic solvent solution of an unhydrolyzed, hydrolyzable mixture of a silicon alkoxide and a titanium alkoxide, the solution having a molarity of about 0.5; coating a fibrous glass surface with the solution; air drying said coated surface for a sufficient period of time to allow moisture in the air to at least partially hydrolyze said alkoxides; curing said hydrolyzed alkoxides by heating in air at a temperature of about 425° C. In a preferred embodiment, prior to the air heating at about 425° F., the air dried, partially hydrolyzed alkoxides are first partially cured by heating in a microwave oven.

DESCRIPTION OF THE PREFERRED EMBODIMENTS

The fibrous glass substrates which are treated in accordance with the present invention are preferably woven fabrics. The coatings are applied directly to the fibrous glass surface that is a hydroxyl rich surface. If the fibrous glass substrate has a size coating on it, as for example might be the case if a woven fabric is treated in accordance with this invention, the fibers are first subjected to a heat cleaning in order to pyrolyze the coating from the surface. Such heat cleaning techniques are well known in the fibrous glass art. Untreated glass fibers are also coatable in accordance with the present invention; after coating, such fibers may be employed in a weaving process to form suitable fabrics which are in turn converted into filter bags.

The fibrous glass substrate coated in accordance with the invention may be glass per se or ceramic provided that surface hydroxyl groups are available to promote adhesion by reaction with the metal alkoxide-hydroxide i.e. hydrolyzed alkoxide coating. Unless otherwise indicated the term "glass" thus includes glass, ceramic and glass-ceramic formulations including fibers made from minerals, such as rock. Preferably conventional glass fibers are used, which may be one or more of many formulations well known in the art. Desirably the glass will be an alkaline earth, aluminosilicate formulation and most preferably an S Glass type fiber. Such glass fibers are well known in the art and are generally magnesia aluminosilicate compositions. Representative S Glass compositions include compositions in which the silica content is about 55–80% by weight, the alumina content about 12–32% by weight, and the magnesia content about 4–20% by weight. Such glass compositions are known for their strength and are ideally adapted for use as in filter bags. For other applications, alkaline earth boro-aluminosilicate compositions, for example E-glass compositions, will be found to be desirable.

As indicated, prior to coating in accordance with the present invention, the surface of the fibrous glass substrate may need to be cleaned to remove a size coating. This can be done by a conventional heat cleaning operation at a temperature of at least about 250° C. to remove the surface contaminants. A particularly suitable heat treating operation has been to heat, for example, fibrous glass cloth in an air recirculating oven at about 375° C. for about forty hours.

The fibrous substrate when coated in accordance with this invention may be in the form of individual filaments, strands, bundles, or in the form of woven or nonwoven cloth or fabric. Preferably when the coated substrate is intended for use as catalytically active filter bags the substrate will be in the form of woven glass cloth with the weave being sufficiently tight to trap the desired particulates.

The alkoxides employed in forming the mixture of a silicon alkoxide or a titanium alkoxide as contemplated herein may be of the formula $Si(OR)_4$ and $Ti(OR)_4$ wherein "R" represents an alkyl group of one to five carbon atoms. That is, the alkoxides are preferably $C_1$ to $C_5$ alkoxides. Especially suitable alkoxides are tetraethyoxysilane, i.e. silicon tetraethoxide, and titanium tetraisopropoxide.

In forming the organic solvent solution of the unhydrolyzed hydrolyzable mixture of the silicon alkoxide and titanium alkoxide which is used to directly coat the fibrous glass substrate, the solvent should be a substantially unhydrolyzed inert organic solvent. Such suitable solvents will be routinely selected by those skilled in the art, but representative solvents include isopropanol, ethanol, other lower alkyl alcohols, e.g. $C_5$ alcohols or less and diacetone alcohol, with diacetone alcohol being especially preferred. Additionally, because of the hydrolitic sensitivity of titanium alkoxides, and in order to form the clear solution of the organic solvent solution of the unhydrolyzed hydrolyzable mixture of the silicon alkoxide and titanium alkoxide, it has been found desirable to employ decanoic acid in the solution. The decanoic acid is employed in amounts sufficient to inhibit the hydrolysis rate of the titanium alkoxide, for example, in amounts of about 80 grams to about 100 grams of decanoic acid per mole of total alkoxide.

The coating can be applied onto the fibrous glass substrate by any conventional technique such as, for example, dipping, padding, or spraying. The concentration of the alkoxide in the solution may likewise vary but outstanding results are obtained with the solution molarity being about 0.5 and employing a molar ratio of the silicon alkoxide to the titanium alkoxide of about 1:1. While a plurality of coats or layers may be applied to the fibrous glass substrate, it is generally sufficient that only one coating application by involved. If plural coatings are employed, all that is needed is to allow one coating solution to air dry prior to applying another coating.

After applying the coating solution to the substrate, the coated surface will be allowed to air dry for a sufficient period of time to allow the moisture in the air to at least partially hydrolyze the alkoxides. This can be done at room temperature for several minutes, say on the order of about thirty minutes or so. The partially hydrolyzed alkoxide is then cured by heating in air (which includes moisture) at a temperature of about 425° C. to essentially fully condense the reaction specie with the elimination of alcohol by-product and then water. Prior to the final heating step where the organic species are removed by a combination of pyrolysis and complete condensation, it has been found desirable to further partially cure, and condense, the hydrolyzed alkoxides by first heating in a microwave oven. The combination of the partial curing in the microwave oven and then the further curing in the hot air oven serves to provide an outstanding coating. Good results have been obtained by employing a microwave cure using about 500 to about 1,000 watts for a period of at least about one minute and preferably for at least about ten minutes.

While the above describes the present invention with sufficient particularity to enable those skilled in the art to make and use same, nonetheless further exemplification follows. In these experiments the fibrous glass substrate which was employed was a woven S Glass cloth (14 ounces per square yard). The cloth in all instances was first heat cleaned by heating in an air recirculating oven at about 375° C. for about forty hours.

EXAMPLE

About 7.1 grams of titanium tetraisopropoxide (0.025 moles) was mixed with about 4.3 grams of decanoic acid. The decanoic acid was employed because it inhibits undesirable premature hydrolysis of the titanium alkoxide and improves the smoothness of the coating. Next about 5.2 grams (0.025 moles) of tetraethoxysilane was added to the solution. The mixture was then diluted to 100 milliliters with diacetone alcohol to thereby prepare a 0.5 molar solution of the substantially unhydrolyzed alkoxides. The heat cleaned swatch of cloth (approximately 7" wide and 6" long) was immersed in the coating solution for several seconds removed and then allowed to air dry for about thirty minutes. The air drying affected a partial hydrolyzing of the alkoxide and then the fabric was cured by a two step process. First the coated fabric was heated using approximately a 700 watt microwave for about ten minutes to partially condense the coating and then this was followed by a final curing to substantially fully condense and remove organic species by heating in a recirculating oven at about four hours at 425° C. The flex-life and resistance to abrasion (in the fill direction) was tested in accordance with ASTM Test No. D2176 using a publicly available Massachusetts Institute of Technology Flex Tester. A four pound load and a No. 8 spring was employed. As a control a blank was employed with the blank being an untreated heat cleaned S Glass cloth. The blank exhibited 75 cycles to failure but the cloth coated in accordance with the present invention exhibited 1,599 cycles to failure.

COMPARATIVE TESTING

Additional testing was done with the results generally being summarized in Table 1. Except as indicated in Table 1, the testing was done as noted above. The silicon alkoxide and the titanium alkoxide were the same as in the previous example. The zirconium alkoxide that was employed was zirconium tetra (n-propoxide) and the vanadyl alkoxide employed was vanadyl n-propylate. As indicated in Table 1, in all instances only a single coat was applied except with regard to Samples No. 6 & 7. In all instances the molar ratio of the alkoxides employed was 1:1 except for Sample No. 8.

Table 1 clearly shows the dramatic improvement in the flex life and abrasion resistance of the coating as exemplified by the highly unexpected magnitude of the cycles to failure. In all instances the abrasion resistance was evaluated in the "fill" direction of the woven cloth.

While the above describes the present invention, it will of course be apparent that modifications are possible which pursuant to the patent statutes and laws do not depart from the spirit and scope thereof.

TABLE I

| Example No. | Solution Molarity | Heat Treatment Temperature | Molar Ratio of Alkoxides [3] | Cycles to Failure |
|---|---|---|---|---|
| 1. | 0.5 | 425° C. | $Si(OR)_4:Ti(OR)_4$ | 1599 |
| 2. | 0.5 | 375° C. | $Si(OR)_4:Ti(OR)_4$ | 119 |
| 3. | 1.0 | 375° C. | $Si(OR)_4:Ti(OR)_4$ | 66 |
| 4. | 0.5 | 375° C. | $Ti(OR)_4$ | 35.2 |
| 5. | 1.0 | 375° C. | $Si(OR)_4:Zr(OR)_4$ | 15 |
| 6. | 0.2 | 375° C. | $Si(OR)_4:Zr(OR)_4$ [1] | 118 |
| 7. | 0.2 | 425° C. | $Si(OR)_4:Zr(OR)_4$ [1] | 53 |

TABLE I-continued

| Example No. | Solution Molarity | Heat Treatment Temperature | Molar Ratio of Alkoxides [3] | Cycles to Failure |
|---|---|---|---|---|
| 8. | 0.5 | 375° C. | V(O)(OR)$_3$:Ti(OR)$_4$ | 58 |
| 9. [2] | — | — | — | 75 |

[1] Three layers (coats) were used instead of one.
[2] Blank - i.e. heat cleaned but untreated glass fiber.
[3] Molar ratio of alkoxides were all 1:1 except the molar ratio of V(O) (OR)$_3$:Ti(OR)$_4$ was 0.4:0.6.

I claim:

1. A method for forming high temperature resistant, abrasion resistant long flex-life coating on fibrous glass substrate comprising: providing an organic solvent solution of an hydrolyzable mixture of a silicon alkoxide and a titanium alkoxide, said solution having a molarity of about 0.5; coating a fibrous glass surface with said solution; air drying said coated surface for a sufficient period of time to allow the moisture in the air to at least partially hydrolyze said alkoxides; curing said hydrolyzed alkoxides by heating in air at a temperature of about 425° C.

2. The method of claim 1 wherein the molar ratio of said mixture of alkoxides is about 1:1.

3. The method of claim 2 wherein each of said alkoxides is a $C_1$ to $C_5$ alkoxide.

4. The method of claim 3 wherein said silicon alkoxide is tetraethyoxysilane.

5. The method of claim 4 wherein said titanium alkoxide is titanium tetraisopropoxide.

6. The method of claim 1 wherein said solution contains decanoic acid in an amount sufficient to inhibit the hydrolysis rate of said titanium alkoxide.

7. The method of claim 1 wherein prior to said air heating at about 425° F., said hydrolyzed alkoxides are partially cured in a microwave oven.

8. The method of claim 1 wherein said fibrous glass is a magnesia aluminosilicate glass.

9. The method of claim 1 wherein said organic solvent solution is a clear solution of an unhydrolyzed, hydrolyzable mixture of said silicon alkoxide and said titanium alkoxide.

10. The method of claim 1 wherein said mixture is an unhydrolyzed mixture.

11. The product of the process of claim 1.

* * * * *